United States Patent [19]

Pritchard

[11] Patent Number: 5,123,061
[45] Date of Patent: Jun. 16, 1992

[54] DATA COMPRESSION/DECOMPRESSION METHOD, DEVICE AND RESULTING DATA STRUCTURE

[75] Inventor: Thomas B. Pritchard, Vancouver, Wash.

[73] Assignee: Hewlett-Packard Company, Palo Alto, Calif.

[21] Appl. No.: 730,038

[22] Filed: Jul. 12, 1991

Related U.S. Application Data

[63] Continuation of Ser. No. 530,049, May 25, 1990, abandoned.

[51] Int. Cl.$^5$ .......................... G06K 9/36; G06K 9/46; H04N 1/419
[52] U.S. Cl. ...................................... 382/56; 358/261.1
[58] Field of Search ............................. 382/56, 54, 1; 358/261.1; 340/735

[56] References Cited

U.S. PATENT DOCUMENTS

| | | | |
|---|---|---|---|
| 3,686,631 | 8/1972 | Elliot | 382/56 |
| 4,307,377 | 12/1981 | Pferd et al. | 382/56 |
| 4,568,983 | 2/1986 | Bobick | 358/261.1 |
| 4,626,829 | 12/1986 | Hauck | 382/56 |
| 4,727,421 | 2/1988 | Koga | 358/133 |
| 4,876,607 | 10/1989 | Tseng | 382/56 |

*Primary Examiner*—Michael Razavi
*Assistant Examiner*—Michael Cammorata

[57] ABSTRACT

The invented data compression/decompression methods, device, and resulting data structures, operate by noting likenesses and differences between portions of data, and effecting data storage only with respect to the noted differences. The compression method arranges the data, compares portions of the data, and provides a flag to signal changes between adjacent data portions. The decompression method reads a portion of data, identifies whether the flag signals any changes in the data, and if so, reads a subsequent portion of data; but if no changes are signaled, then the first portion of data is duplicated. The invented device includes memory, a structure for storing data in the memory, data stored in the memory with flags to signal changes in the data, and structure for accessing and using the stored data. The invented data structure includes data divided into predetermined sections, and flags associated with the sections to signal changes within the sections.

4 Claims, 13 Drawing Sheets

DATA COMPRESSION/DECOMPRESSION METHOD, DEVICE AND RESULTING DATA STRUCTURE

This application is a continuation of application Ser. No. 07/530,049 filed May 25, 1990, now abandoned.

TECHNICAL FIELD

This invention relates to methods of data compression and decompression, a device employing the methods, and to resulting compressed data structures. More particularly, this invention relates to methods of data compression and decompression that may be employed by a printer to compress font data.

BACKGROUND ART

A font is a family of characters of a given style, typically used in printing. A font character is one symbol in the font.

Font characters are typically defined as a predetermined arrangement of data. For example, bytes of data may be arranged or stacked to produce the desired character. The bytes are made from numerous bits of information. In a printing system such as an ink-jet printer, font characters are created from ink dots that are positioned on a page. In such a system, each ink dot is represented by one bit of information. Thus, the data may be arranged so that each bit is positioned analogously to the desired position of an ink dot on a page.

In computer printing systems, fonts are often stored in a printer's memory and accessed by commands from a host computer. The more characters in the font, the more memory that is needed to store them. The total memory needed to store the font is referred to as the font size.

Memory is expensive, so font data is often compressed and then decompressed. The greater the compression the less memory required. However, compression and decompression methods are often complex and time consuming.

The invented compression and decompression methods, device and resulting data structure constitute a successful compromise between the amount of compression, the complexity of the compression and decompression, and the time needed to compress and decompress data. In other words, the invention allows for data such as font character data to be compressed into a smaller-sized memory, resulting in a less expensive printing system or a printing system which has more font characters for the same cost, while avoiding undue complexity and impractical time restraints.

SUMMARY OF THE INVENTION

The invented data compression/decompression methods, device, and resulting data structures, operate by noting likenesses and differences between portions of data, and effecting data storage only with respect to the noted differences. The compression method arranges the data, compares portions of the data, and provides a flag to signal changes between adjacent portions. The decompression method reads a portion of data, identifies whether the flag signals any changes in the data, and if so, reads a subsequent portion of data. If no changes are signaled, then the first portion of data is duplicated. The invented device includes memory, a structure for storing data in the memory, data stored in the memory with flags to signal changes in the data, and structure for accessing and using the stored data. The invented data structure includes data divided into predetermined sections, and flags associated with the sections to signal changes within the sections.

BRIEF DESCRIPTION OF THE DRAWINGS

FIG. 7D is a Diagram showing how FIGS. 7A, 7B and 7C relate, and FIGS. 7A, 7B and 7C together constitute another detailed block diagram of the invented compression method as it would be used with a data structure as shown in FIG. 4.

FIG. 9 is a diagram showing how FIGS. 9A and 9B relate, and FIGS. 9A and 9B together constitute a detailed block diagram of the invented decompression method as it would be used with the data structure of FIG. 4.

DETAILED DESCRIPTION AND BEST MODE FOR CARRYING OUT THE INVENTION

The invented data compression method recognizes that data such as font character data, is often repetitive, especially in the vertical direction. Data can be compressed by noting and signaling changes rather than by storing the repetitive data.

Figure 1:
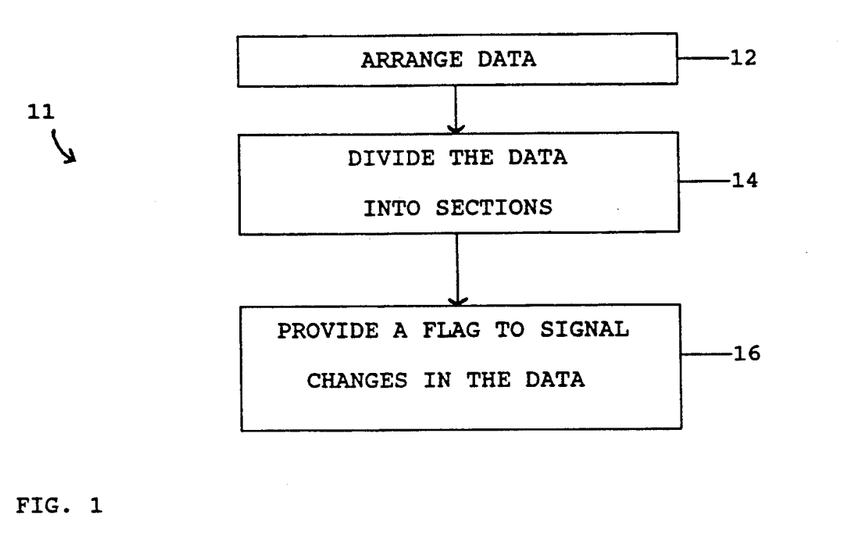
FIGS. 1 and 2 are simple block diagrams of two perspectives of the invented compression method.

FIG. 1 shows generally at 11, a simple block diagram of one perspective of the invented compression method. First, the invented compression method arranges the data into data words, as represented by block 12. A data word is a predetermined portion of data, and in the preferred embodiment, it includes 16-bits of information. The data is then divided into sections, as shown by block 14. The sections are a predetermined number of data words. The method then provides a flag or flag means to signal changes between data words, as represented by block 16. The flag or flag means is often a portion of data that signals changes. Typically, one flag is associated with each section and the flag's size determines the section's size.

In the preferred embodiment, the flag is made from 16-bits of information, where each bit is associated with one data word and signals changes between adjacent data words. Additionally, the characters are divided into columns, which in turn are divided into sections. The number of sections per column is determined by dividing the column's height by 16, corresponding to the flag's size. If the height is not evenly divisible by 16, then one option is to round up by one the number of sections, and the extra rows at the bottom of the character may be ignored or filled with zeros.

Figure 2:
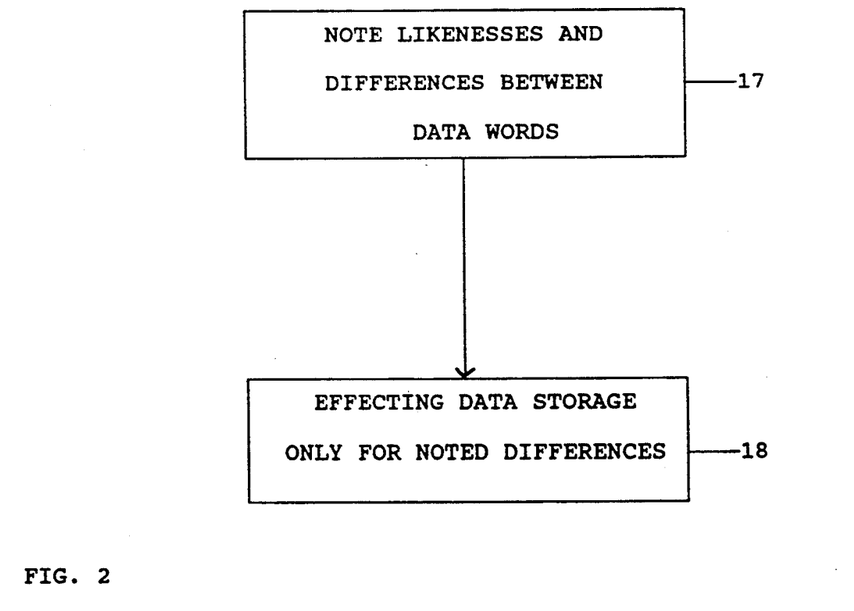

The invented compression method may also be described, as shown in FIG. 2, as noting likenesses and differences between column-adjacent words, as shown at 17, and effecting data storage only with respect to noted differences, as shown at 18. In the preferred embodiment, "column-adjacent data words" refers to vertically-adjacent data words such as data words 40 and 42 in FIG. 3. Noting the likenesses and differences may include creating a control flag reflective of them. The flag would "control" whether data is stored or not.

Figure 3:
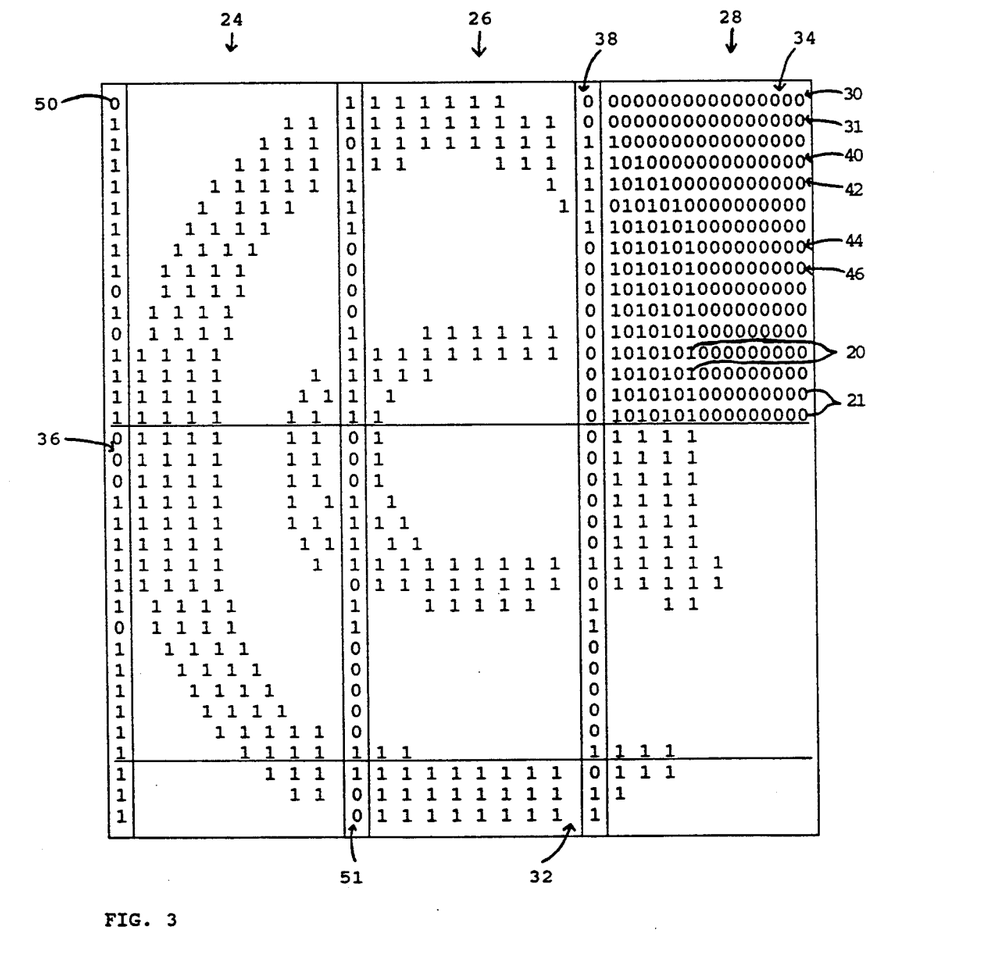
FIG. 3 is a dot pattern of the invented data structure for the character "@", with the pattern divided into columns and sections.

FIG. 3 is a dot pattern of a data structure for the character "@" constructed according to the invention. This pattern has been drawn as it would exist for a scanning printhead ink-jet printer having a resolution of 600-dots-per-inch horizontal by 300-dots-per-inch vertical.

An ink-jet printer prints by shooting drops of ink onto a page. The "@" of FIG. 3 is depicted in a bit image format, or in other words, the pattern of FIG. 3 may be stored in the memory of a printer in such a way that each available space for a drop of ink may be represented by a bit of information. A bit, or binary digit, is the basic unit of information in a computer, and may be either "1" or "0". If the bit is "1", it may be thought of as "on", and an ink drop will be printed in the corresponding location. If the bit is "0", it is "off" and an ink drop will not be printed. However, if desired, a "1" may be thought of as a bit that is "off", and a "0" may be thought of as a bit that is "on". In the following description, a bit that is "1" will be "on", and a bit that is "0" will be "off". The bits of FIG. 3 may also be referred to as dot data because they represent drops or dots of ink.

In FIG. 3, the "@" symbol is made from an arrangement of "1s", such as those identified at 20, and "0s" such as those identified at 21. The "1s" represent dots of ink and the "0s" represent blank spaces. Only the zeros in the upper-right-hand section of FIG. 3 are shown to simplify the drawing. Nevertheless, the remaining blank spaces in FIG. 3 should be thought of as "0s", and a "0" exists between every two horizontally adjacent "1s". Blank spaces or "0s" are positioned between dots or "1s" in order to get a better definition of a character's outer edge. As can be seen in FIG. 3, and as will be understood after reading the following discussion, the "0s" between the "1s" often result in a vertical repetition of data, which is taken advantage of by the invented compression method.

In FIG. 3, the "@" is divided into three columns, 24, 26 and 28. Each column contains vertically adjacent data words, such as words 30 and 31. Again, the data words are 16-bit portions of data and in FIG. 3, they are oriented horizontally. Font characters also are defined as having a predetermined height and width. The character's height defines the top and bottom of the columns, and the width is used in determining the number of columns. Height is often defined as the number of rows of data, and width is often defined as the number of bits across.

Each of columns 24, 26 and 28 has been divided into predetermined sections, such as sections 32 and 34. Each section contains 16 vertically adjacent data words. In FIG. 3, the bottom section of each column, such as section 32 in column 26, contains three vertically adjacent data words.

Associated with each section is a flag including 16-bits of information, such as flags 36 and 38. Again, the size of the flag determines the size of the sections. The flags are arranged into columns so that the flag bits may signal changes between vertically adjacent data words. Each bit of each flag is associated with one data word.

For example, flag 38 includes 16-bits arranged vertically. If the most significant bit is the upper-most bit in the column, the flag may be written horizontally as "0011111000000000". The most significant or upper-most bit is "0" and is associated with data word 30. The fourth bit, counting from the most significant bit down if the flag is oriented vertically, or counting from the most significant bit to the right if the flag is oriented horizontally, is a "1", and is associated with data word 40. Similarly, the fifth bit from the most significant bit is associated with data word 42, the eighth bit is associated with data word 44, and the ninth bit is associated with data word 46.

The flag bits signal changes between data words by either being a "0" or a "1". If the bit is a "0" it may be thought of as "off", which is interpreted as meaning that the bit's associated word is identical to the immediately preceding word. For example, the flag bit associated with word 46 is zero, meaning that word 46 is identical to word 44.

If the flag bit is "1" it may be thought of as "on", meaning that its associated data word is different than the immediately preceding word. For example, the flag bit associated with word 42 is "1", meaning that word 42 is different than word 40.

Typically the beginning data word of a character, such as the data word in column 24 associated with a flag bit 50, is compared to a reference data word. In the preferred embodiment, the reference data word is "0000000000000000", and it is not depicted in FIG. 3. The data word associated with flag bit 50 is identical to the reference data word, and therefore flag bit 50 is "0". In the preferred embodiment, the top word in each of columns 24, 26 and 28 is compared to the reference word. Alternatively, each top word may be compared with the bottom most word of the immediately preceding column.

The invented data structure depicted in FIG. 3 allows the invented compression method to compress the data needed to print the "@" character because only the flags and changes between vertically adjacent data words need to be stored in memory. Specifically, the information that must be stored to replicate FIG. 3 is (the following flags and dot data are written in hexadecimal notation):

| | |
|---|---|
| Flag | 7FAF |
| Dot Data | 000A 002A 00AA 02AA 04A8 0AA0 1540 2A80 5500 AA00 AA02 AA05 AA0A |
| Flag | 1FDF |
| Dot Data | AA09 AA0A AA05 AA02 AA00 5500 2A80 1540 0AA0 0550 02AA 00AA |
| Flag | E000 |
| Dot Data | 002A 000A 0000 |
| Flag | DE1F |
| Dot Data | AAA0 AAAA A02A 0002 0001 0000 0AAA AAAA A800 4000 8000 |
| Flag | 1EC1 |
| Dot Data | 4000 A000 5000 AAAA 0AA8 0000 A000 |
| Flag | 8000 |
| Dot Data | AAAA |
| Flag | 3E00 |
| Dot Data | 8000 A000 A800 5400 AA00 |
| Flag | 02C1 |
| Dot Data | AA80 0A00 0000 A800 |
| Flag | 6000 |
| Dot Data | 8000 0000 |

The bottom section of each of columns 24, 26 and 28, such as section 32, is only three data words high because that is all that is required by the character. Accordingly, the flags depicted in FIG. 3 that are associated with those sections, such as flag 51, are 3-bits high. However, most printing systems deal with either one or two bytes of data at a time, so groups of 8- or 16-bits are preferred. Accordingly, the flags such as flag 51, may be thought of as being 16-bits high with the remaining bits all zero.

FIG. 3 illustrates one way of employing the invention, and the previous discussion explains the basic features of the invented compression method and data structure. However, the data structure of FIG. 3, while operable, can be improved upon, and the improvement is shown in FIG. 4.

Figure 4:
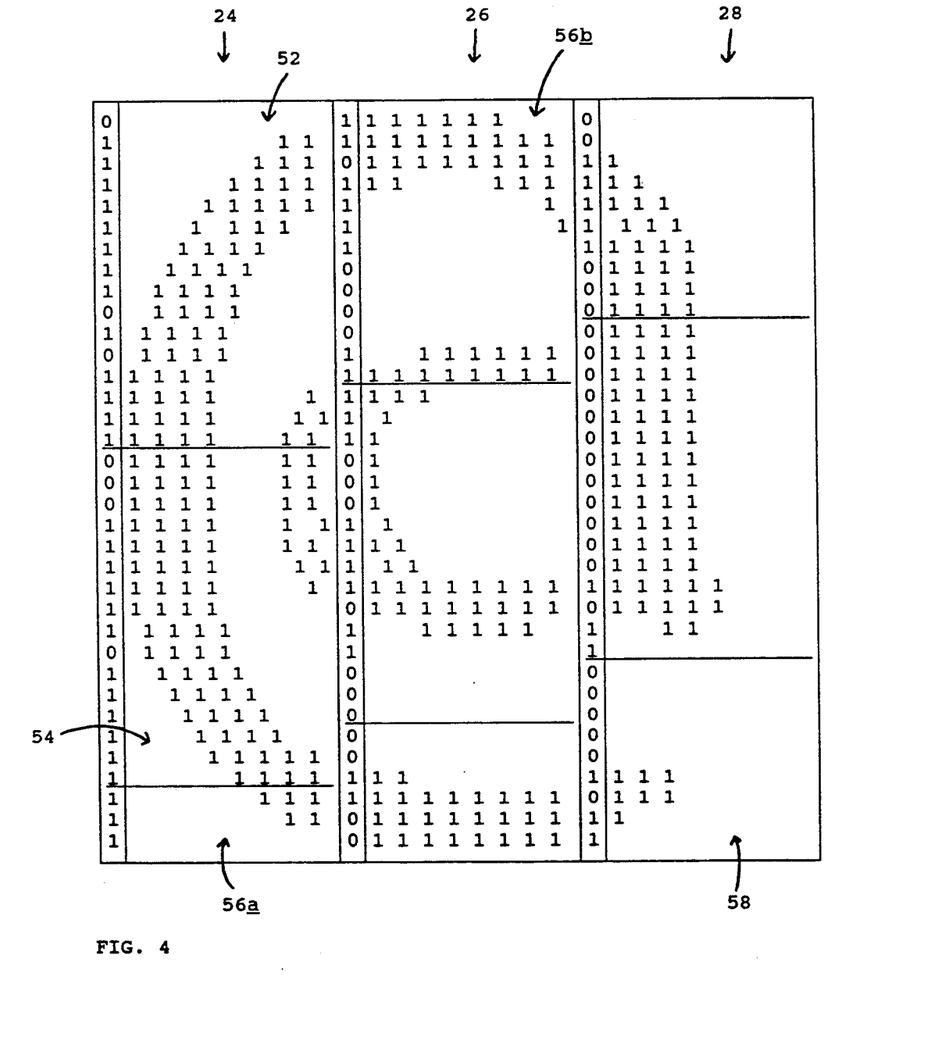
FIG. 4 is similar to FIG. 2, except that the sections wrap around from one column to the next.

FIG. 4 illustrates an enhanced data structure for the same "@" character as in FIG. 3. The data structure of FIG. 4 is preferred over that of FIG. 3 because it requires still less memory. In practice, the data structure of FIG. 4 will be used rather than that of FIG. 3, even though the data structure of FIG. 3 is operable.

The improved data structure shown in FIG. 4 is similar to that shown in FIG. 3, except that the sections extend or wrap around from one column to the next. In this manner, the unused flag bits at the bottom of the columns in FIG. 3, are used. For example, in FIG. 4 column 24 is divided into sections 52, 54 and 56a. Each section has a corresponding flag, just as in FIG. 3. However, section 56a extends to section 56b in column 26. The flag associated with section 56a also wraps around and extends to section 56b. Similarly, the bottom section of column 26 extends to the top of column 28. The bottom section 58 in column 28 only requires nine flag bits to finish describing the character, and the remaining flag bits may be neglected or set to zero.

The data that must be stored to reproduce the "@" of FIG. 4 is (again in hexadecimal notation):

| Flag | 7FAF |
| --- | --- |
| Dot Data | 000A 002A 00AA 02AA 04A8 0AA0 1540 2A80 5500 AA00 AA02 AA05 AA0A |
| Flag | 1FDF |
| Dot Data | AA09 AA0A AA05 AA02 AA00 5500 2A80 1540 0AA0 0550 02AA 00AA |
| Flag | FBC3 |
| Dot Data | 002A 000A 0000 AAA0 AAAA A02A 0002 0001 0000 0AAA AAAA |
| Flag | E3D8 |
| Dot Data | A800 4000 8000 4000 A000 5000 AAAA 0AA8 0000 |
| Flag | 30F8 |
| Dot Data | A000 AAAA 8000 A000 A800 5400 AA00 |
| Flag | 000B |
| Dot Data | AA80 0A00 0000 |
| Flag | 0580 |
| Dot Data | A800 8000 0000 |

The invented data structure described above and illustrated by FIGS. 3 and 4 may be stored in memory means, or memory chips, in an electronic device. The amount of memory required to store the dot data or bits that make up the "@" character depicted in FIG. 4 using the rectangular character outline shown with horizontal 16-bit word alignment, without employing the invented compression method, is 210-bytes. The amount of memory required to store the same "@" character using the invented compression method and the wrap around sections as shown in FIG. 4, including the flags, is 130-bytes (not counting any reference bytes), nearly a 40% savings. Typical characters exhibit approximately 50% savings while large characters generally exhibit even greater savings. The "@" does not compress as well as most characters because it has many curved character stems and borders.

Figure 5:
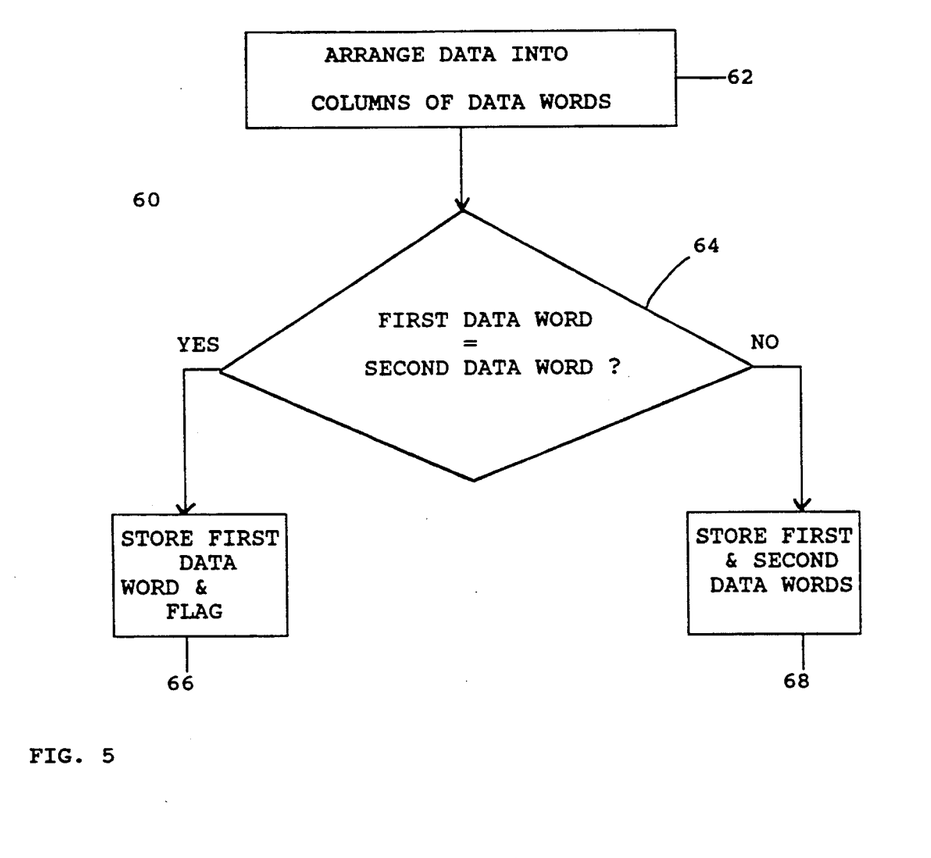
FIG. 5 is another simple block diagram of another perspective of the invented compression method.

By understanding the invented data structures, different perspectives of the invented compression method can be understood in greater detail. FIG. 5 is one perspective of the invented compression method. First, the method arranges the data into columns of data words, as represented by box 62. In other words, the data is organized similar to what is depicted in FIGS. 3 and 4. Then, at 64, the method compares a first data word with a second data word. As explained previously, the first data word may be a reference data word. If the second data word is identical or equal to the first word, then the method stores the first word and a flag to signal that the second word is identical to the first word, as shown at 66. (If the first data word is a reference data word, only the flag needs to be stored.) The terms "store" and "storing" may refer to recording the data in memory, or to the act of creating a compressed code representing the data and flags. If the second data word is not identical to the first data word, then both the first and second data words are stored, and a flag is also stored to indicate that the data words are not identical, all shown at 68.

Figure 6:
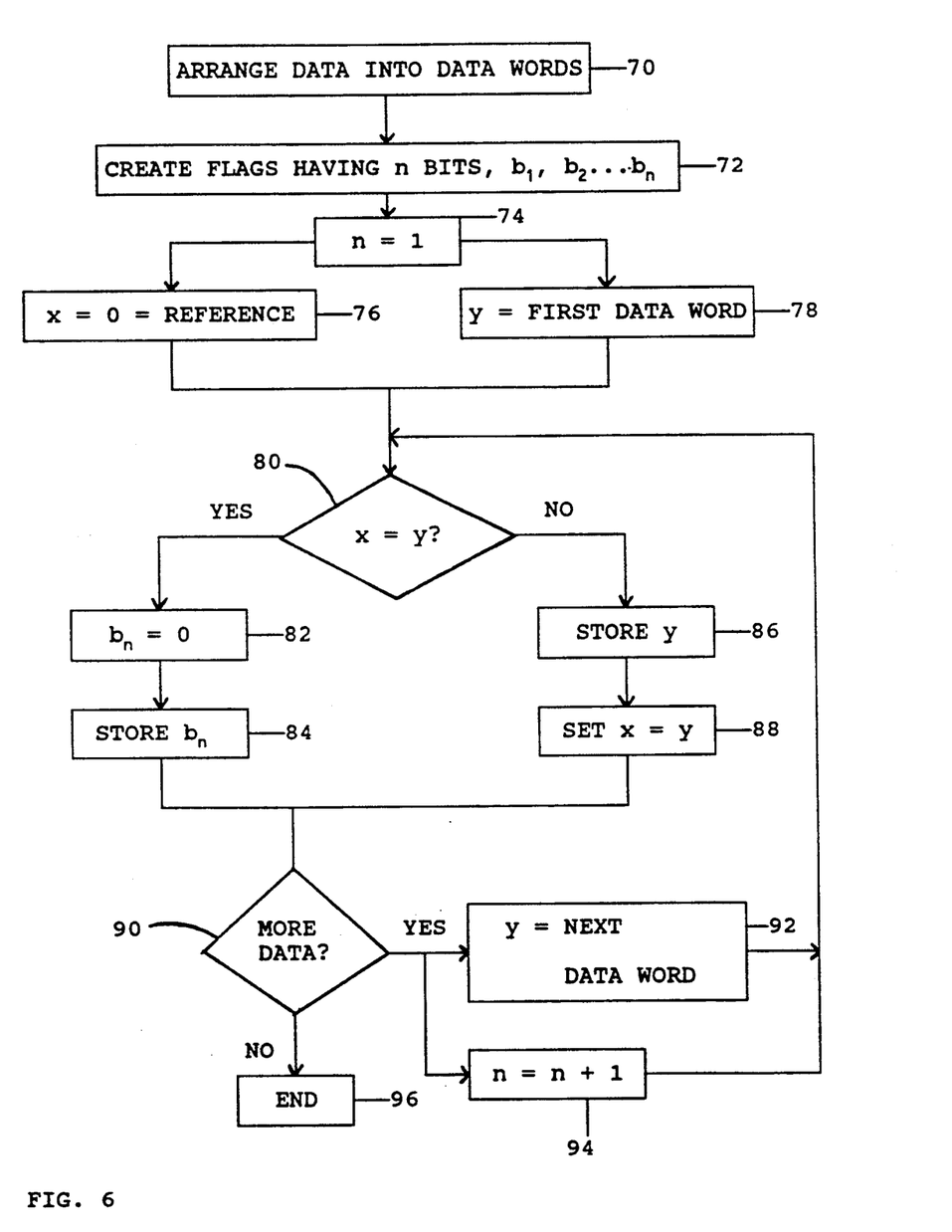
FIG. 6 is a detailed block diagram of the invented compression method.

A detailed block diagram of the invented compression method is shown in FIG. 6. First, as shown at block 70, the method arranges the data into data words. At block 72 the method creates flags, where each flag has a predetermined number of bits. In the preferred embodiment the flags have 16-bits. In block 72, the number of bits per flag is represented as "n", and each bit is identified as $b_1, b_2, \ldots b_n$, where $b_1$ is the most significant bit. The method then recognizes the first bit of the first flag associated with the data to be compressed and compares its associated data word with a subsequent data word. This is accomplished by setting "n=1" as shown in box 74, setting a reference data word (represented as "x" in FIG. 6) equal to zero as shown in block 76, and recognizing the first data word (identified as "y" in FIG. 6) as shown in step 78. The steps shown at 76 and 78 are parallel, but they may also be done serially. The reference data word or "x" is then compared to the first data word or "y" at 80. If the two are equal, then the method sets the first flag bit $b_1$ equal to zero, as shown at 82, and stores it, as shown at 84.

If "x" is not equal to "y", then the method stores "y", or the first data word, as shown at 86, and then sets "x=y", as shown at step 88. In other words, the method stores the first data word and then prepares itself to compare any subsequent data words to the just-stored data word.

Whether more data exists is determined at 90, and if so, "y" is changed to the next data word at 92 and "n" is changed to "n+1" at 94. Steps 92 and 94 are shown in parallel, but they may be done serially. The method then repeats beginning with step 80. Expressed differently, the method simply takes the next data word and compares it with the previous data word and stores the appropriate information, depending on whether the next data word is identical to the previous data word. This is repeated until no more data needs to be compressed, after which the method ends as shown at 96.

Figure 7A:
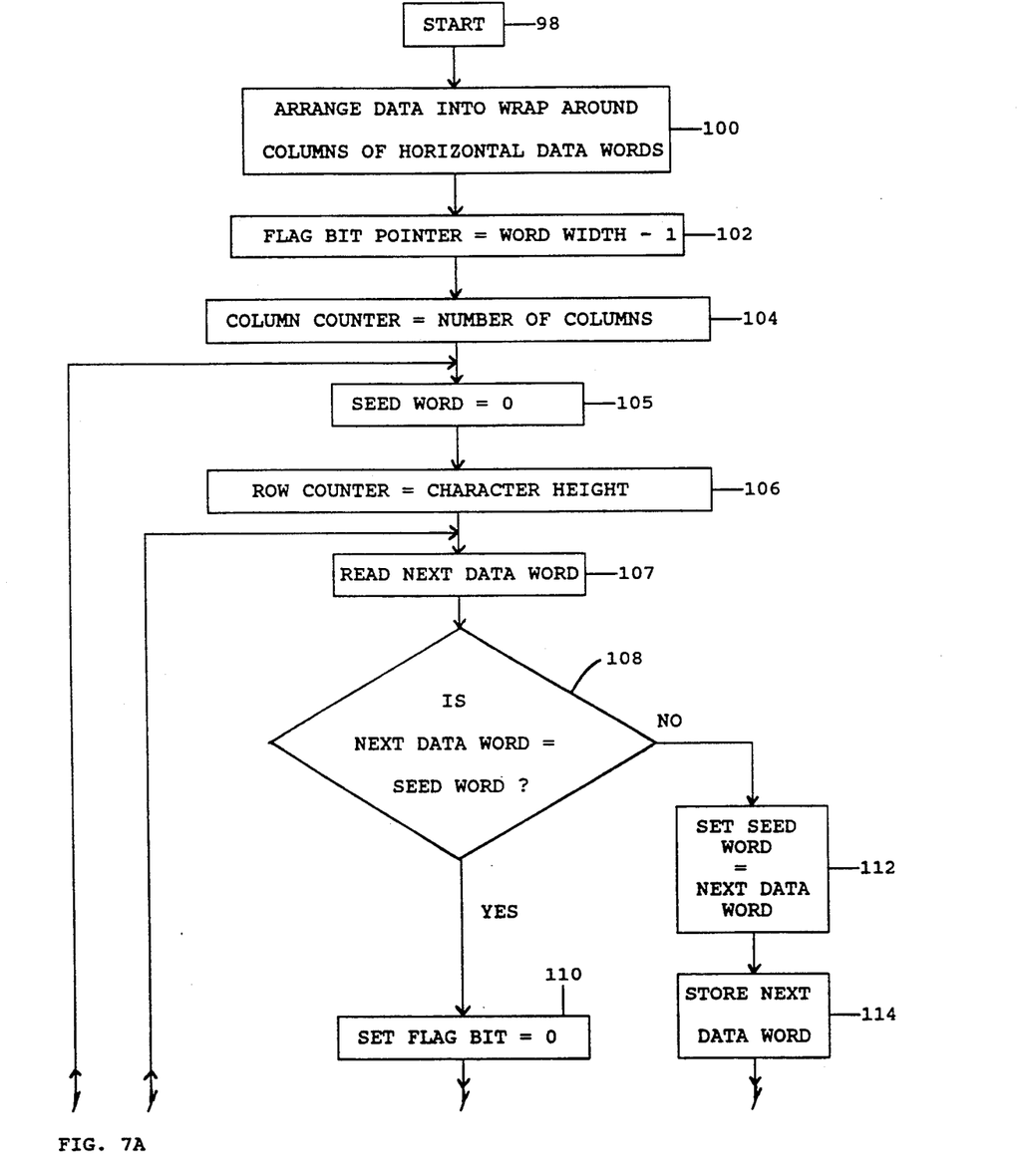
Figure 7B:
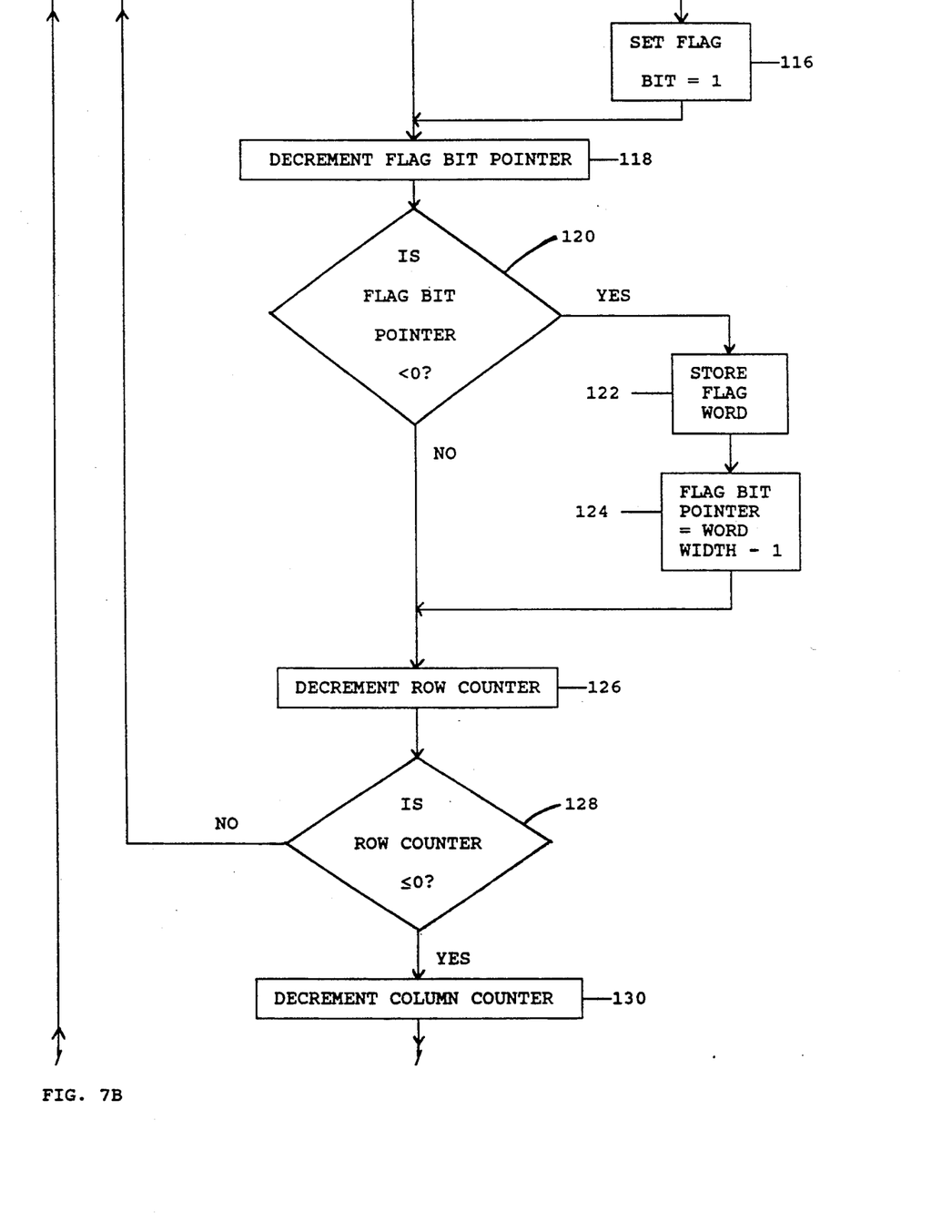
Figure 7C:
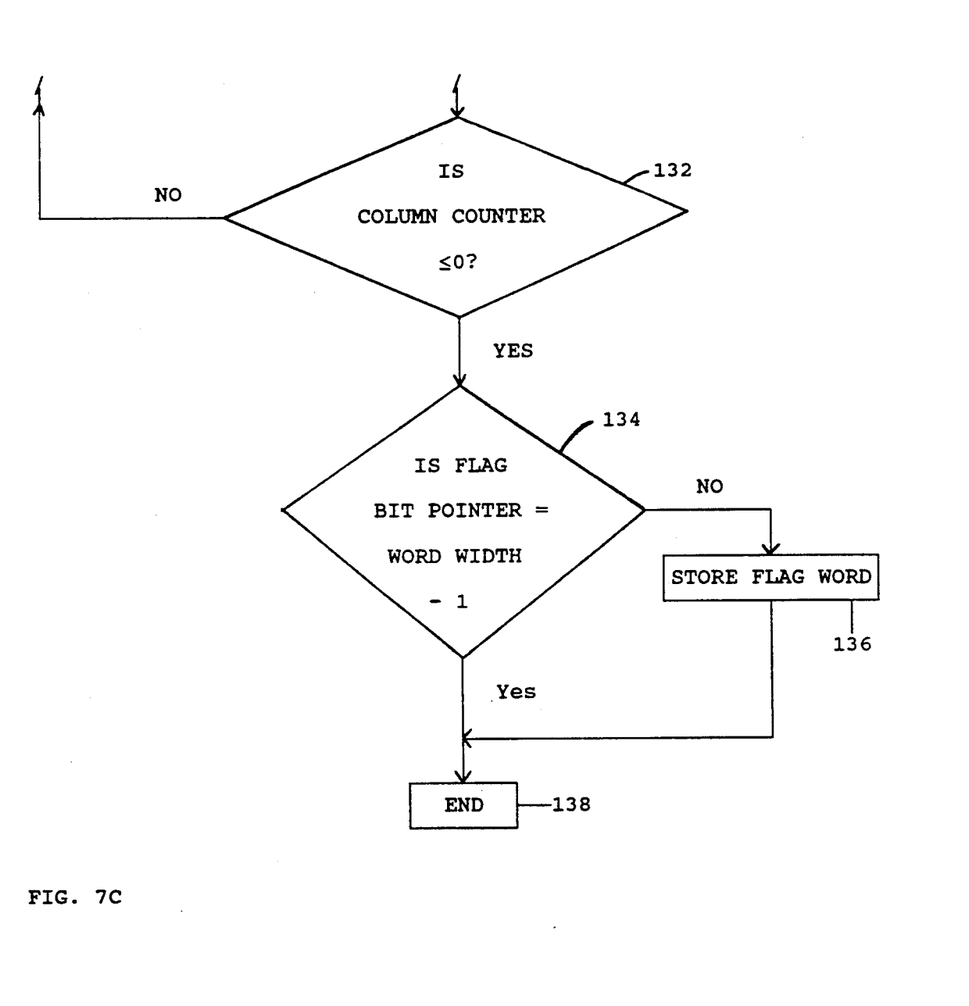
Figure 7D:
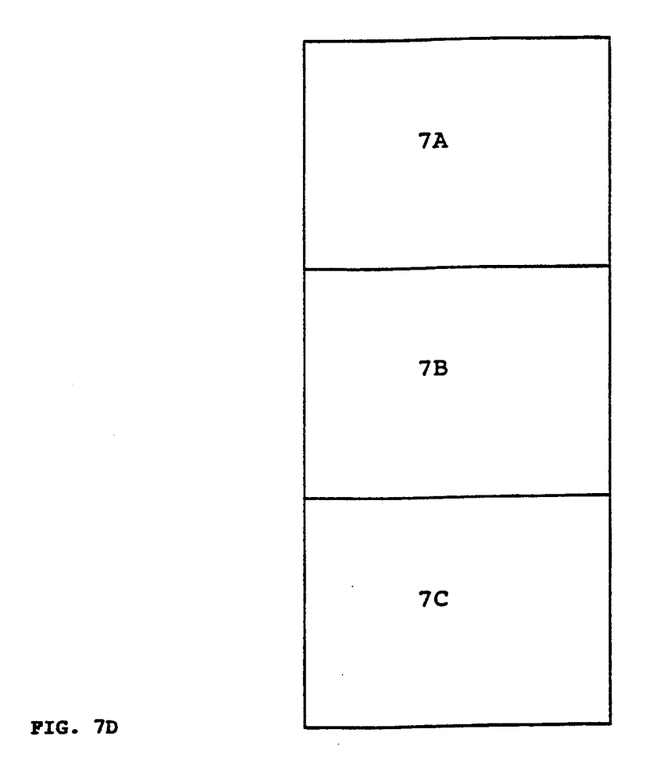

FIGS. 7A, 7B and 7C together constitute another detailed block diagram of the invented compression method as it would be used with the data structure shown in FIG. 4, including wrap around sections. FIG. 7D diagrams how FIGS. 7A, 7B and 7C fit together, and FIGS. 7A, 7B and 7C illustrate the preferred embodiment of the invented compression method.

At block 98, the method starts, and at 100 the method arranges data into wrap around columns of horizontal data words, such as illustrated in FIG. 4.

As explained previously, in the preferred embodiment each data word is 16-bits wide. The method also uses flags, as explained previously, and in the preferred embodiment each flag has 16-flag bits. The most significant flag bit may be thought of as the fifteen flag bit and the least significant flag bit may be thought of as the zero flag bit. At block 102, a flag bit pointer identifies a particular flag bit. Initially the pointer identifies the fifteenth flag bit or the flag bit equal to the data word width minus one.

At 104, a column counter is set to equal the number of columns that makes up the character. If the character is the "@" symbol of FIG. 4, then the column counter is set to three.

At 105, a seed word is set equal to zero. The seed word is initially the reference data word, but subsequently is set equal to a data word. At 106, a row counter is set equal to the character's height. As stated previously, each character is defined with a certain height, and that height is often measured by rows of data or dots.

At 107, the method reads the next data word and at 108 compares that data word to the seed word. Initially, the next data word is the first data word and the seed word is the reference data word. If they are the same, then the appropriate flag bit is set to zero at 110. If the two words are different, then the seed word is changed to the next data word at 112, the next data word is stored at 114, and the appropriate flag bit is set equal to one at 116.

The flag bit pointer is decremented at 118, and step 120 determines whether the pointer is less than zero. If it is, the flag word is stored at 122 and the flag bit pointer is reset at 124 to the word width minus one, which in the preferred embodiment equals 15.

At 126 the row counter is decremented and step 128 determines whether the row counter is less than or equal to zero. If not, the method repeats beginning with step 107, but if so, then the column counter is decremented as shown at 130. Decrementing the row counter causes the method to move from one data word to the next, and decrementing the column counter causes the method to move from column to column.

Step 132 determines whether the column counter is less than or equal to zero and if not, the method repeats beginning with step 105. If the column counter is less than or equal to zero, then the method determines whether the flag bit pointer is equal to the word width minus one at step 134. If not, the flag word is stored at step 136 but if so the method ends at block 138. The embodiment described in FIGS. 7A, 7B and 7C may be employed by software or firmware in a computing system.

Figure 8:
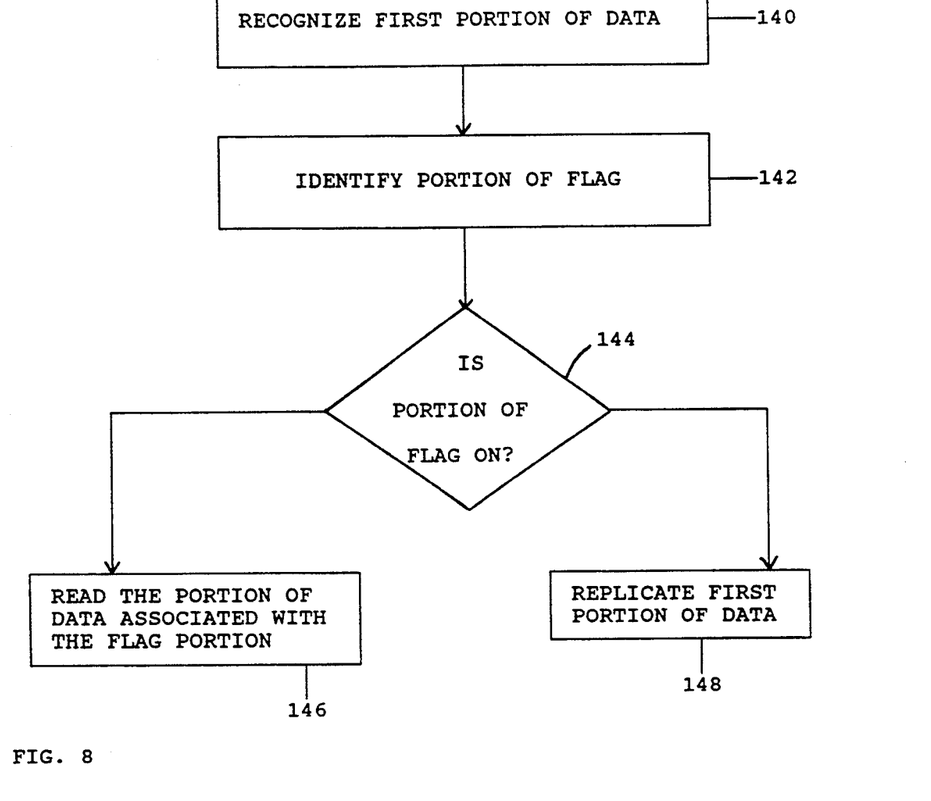
FIG. 8 is a block diagram of the invented decompression method.

The invented decompression method is easily understood in light of the compression method, and FIG. 8 is a simple block diagram of the invented decompression method. The decompression method would be used with data stored and structured according to the above-described compression method and data structure.

As shown in FIG. 8, the decompression method would initially recognize a first portion of data at 140. In the preferred embodiment, the first portion of data is the reference data word. At step 142, the method identifies a portion of the first flag of the data to be decompressed. In the preferred embodiment, the method would identify the first flag bit of the data. Whether the flag portion is "on" is determined at 144, and if so, the method reads the portion of data associated with it, as shown at 146. If the portion of the flag is "off", then the method replicates the first portion of data, as shown at 148. In the preferred embodiment, if the first flag bit is "1", the method reads its associated data word but, if the first flag bit is "0", then the reference data word is replicated. These steps are repeated for additional data, with subsequent adjacent data words compared.

Figure 9:
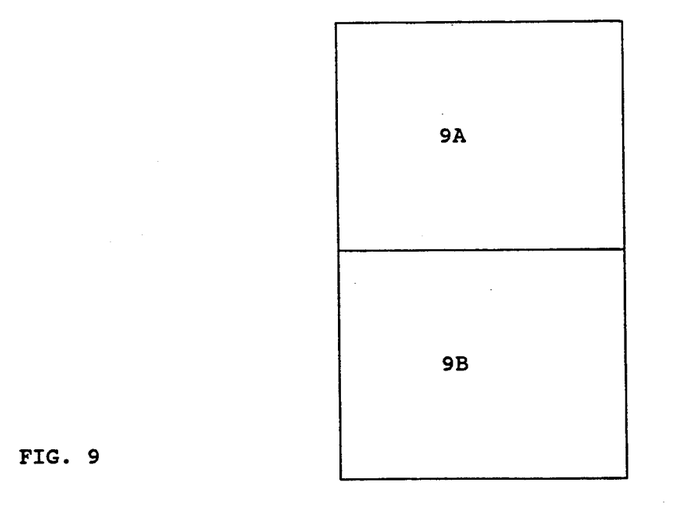
Figure 9A:
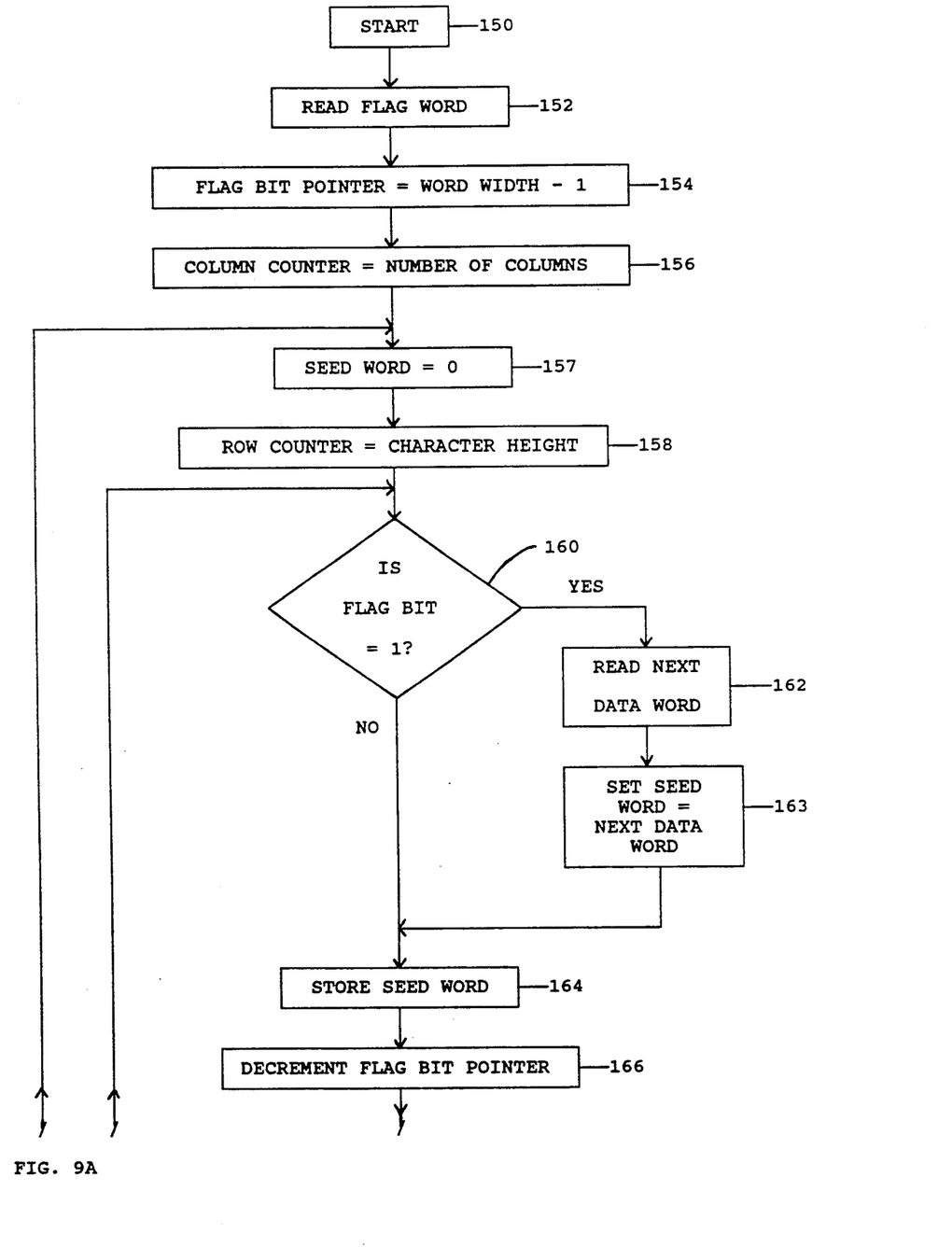
Figure 9B:
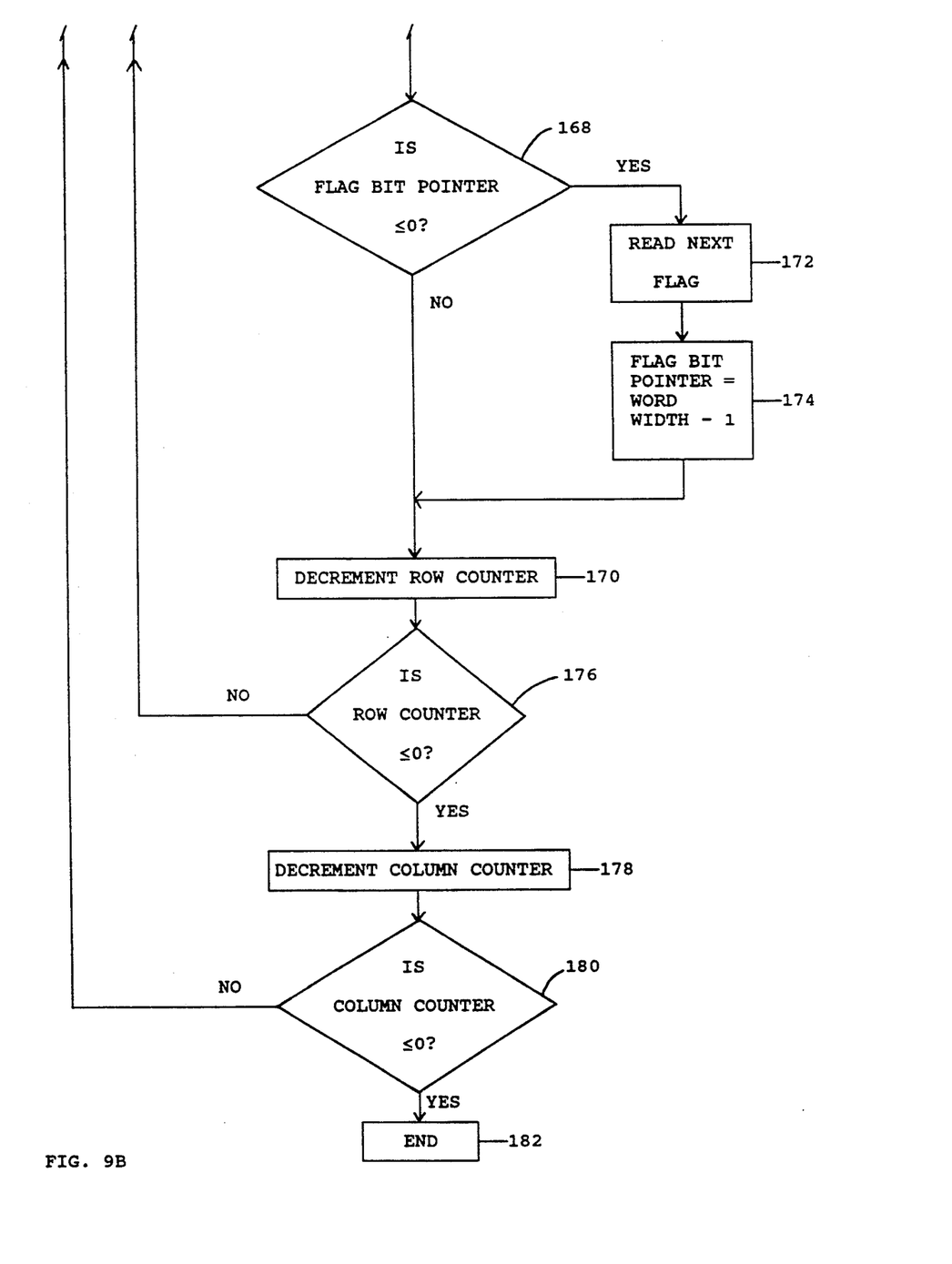

FIGS. 9A and 9B together constitute a detailed block diagram of the preferred embodiment of the invented decompression method. FIG. 9 shows how FIGS. 9A and 9B fit together. The method starts at 150 and reads the first flag word at 152. Again, a flag word in the preferred embodiment includes 16-flag bits. At 154, a flag bit pointer is set equal to the flag word width minus one, which in the preferred embodiment would point to the most significant flag bit. At 156 a column counter is set equal to the number of columns, at 157 a seed word is set equal to zero, and at 158 a row counter is set equal to the character height.

The decompression method depicted in FIGS. 9A and 9B recognizes that the data describing a character is stored in memory, and when it is to be used, the data is decompressed and stored at a different memory location. With that in mind, step 160 determines whether the flag bit identified by the flag bit pointer is equal to one. If it is equal to one, then the method reads the next data word from memory, as shown at 162, sets the seed word equal to the data word at 163, and then stores the seed word into the memory where the character will be compiled, as shown at 164. If the flag bit is not equal to one, then the method simply stores the seed word as shown at 164.

The flag bit pointer is decremented at 166, and step 168 determines whether it is less than or equal to zero. If not, then the row counter is decremented at 170, but if so, then the next flag word is read at 172 and the flag bit pointer is set to the data word width minus one at 174, before the row counter is decremented. If the row counter is less than or equal to zero, as determined at 176, then the column counter is decremented at 178. If the row counter is greater than zero, then the method repeats beginning with step 160. If the column counter is less than or equal to zero, as determined at 180, then the method ends at 182, but if it is greater than zero then the method repeats beginning with step 157. The preferred embodiment of the invented decompression method, as depicted in FIGS. 9A and 9B, is performed primarily by hardware and firmware.

Figure 10:
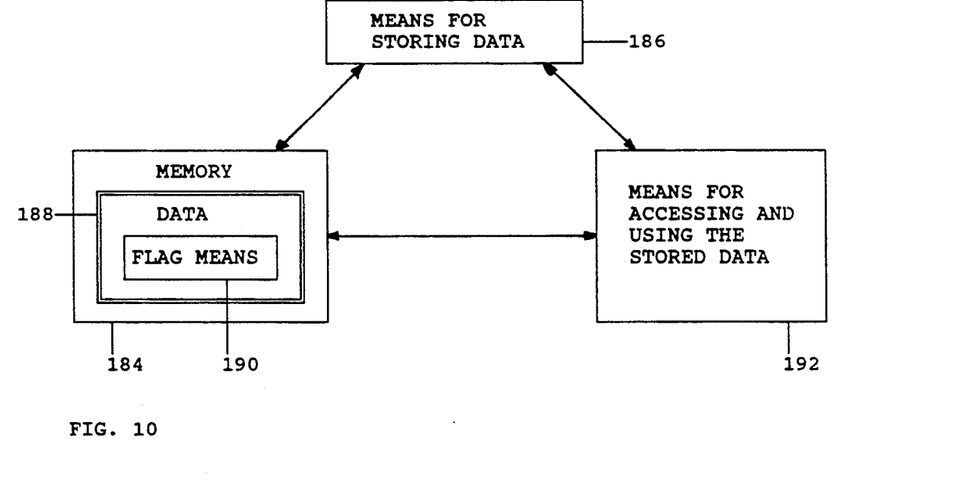
FIG. 10 is a block diagram of the invented device capable of compressing and decompressing data.

FIG. 10 is a simple block diagram of the invented electronic device capable of employing the invented compression/decompression methods and data structure. The device includes a memory 184, such as standard memory chips, and a means 186 for storing data in the memory. Memory 184 includes data 188 that has flag means 190, such as the flags described above, for signaling changes between sections of data 188. The device also includes a means 192 for accessing and using the data 188. The memory, means for storing data, and means for accessing and using the data are operatively associated with each other, as they would be in a computer. The means for storing data may include any means that enables a device to record information in memory according to the data structures described above, including read/write heads, custom integrated circuits or other mechanisms capable of reading from and writing to memory. The means for accessing and using the stored data may include read/write heads, disk drives, display terminals, printers and other such devices.

INDUSTRIAL APPLICABILITY

The invention is applicable to any situation where data needs to be compressed. Particularly, the invented methods, data structure, and device are applicable in the computer printer industry to font data compression and decompression.

While the best mode and preferred embodiment of the invention have been described, variations and changes may be made without departing from the spirit of the invention. The invented methods, data structure, and device may be used in conjunction with data other than font data.

What is claimed is:

1. A method of compressing data defining a character of a font, where the data includes bits that define the character in a bit image format, said method comprising:

arranging the bits into horizontal rows of a predetermined number of bits long;

parting the rows into the vertical columns of a predetermined number of bits wide, where the bits within each resulting part of each row in each column form a data word;

dividing the columns into sections, where each section includes a predetermined number of data words;

creating a flag word for each section comprising a predetermined number of flag bits with each flag bit associated with a different data word;

using the flag bits to signal whether vertically adjacent data words are identical or different; and saving the flag words and only those vertically adjacent data words which are different as a description of the character; and wherein said method employs a flag bit pointer, a column counter, and a row counter, and wherein, further the step of using the flag bits to signal whether vertically adjacent data words are identical or different comprises:

setting the flag bit pointer equal to the column's width minus one;

setting the column counter equal to the number of columns that make up the character;

creating a seed word with an initial value;

setting the row counter equal to the column's height;

reading the data word associated with the column and row specified by the column and row counters (referred to as the "next data word");

comparing the next data word with the seed word;

if the next data word is identical to the seed word, setting the flag bit identified by the flag bit pointer equal to a first predetermined value;

if the next data word is different than the seed word, setting the seed word equal to the next data word, storing the next data word, and setting the flag bit identified by the flag bit pointer equal to a second predetermined value;

decrementing the flag bit pointer;

determining if the flag bit pointer is less than zero;

if so, storing the flag word, setting the flag bit pointer equal to the column's width minus one, and decrementing the row counter;

if not, decrementing the row counter;

determining if the row counter is less than or equal to zero;

if so, decrementing the column counter;

if not, repeating the steps listed above beginning with the step of reading the data word associated with the column and row specified by the column and row counters;

determining if the column counter is less than or equal to zero;

if so, determining if the flag bit pointer is equal to the column's width minus one;

if not, repeating the steps listed above beginning with the step of reading the data word associated with the column and row specified by the column and row counters;

if the flag bit pointer is not equal to the column's width minus one, storing the flag word;

if the flag bit pointer is equal to the column's width minus one, proceeding with the step of saving the flag words and unique data words as a description of the character, where the vertically adjacent data words that are different are the stored next data words.

2. The method of claim 1 where the number of flag bits per flag word equals the number of data words per section.

3. The method of claim 1 where the sections extend from one column to another.

4. A method of decompressing compressed data defining a character of a font, where the compressed data includes a sequence of flag words and data words that describe the character in a bit image format as a predetermined number of horizontal rows, each row a predetermined number of bits long, and a predetermined number of vertical columns, each column a predetermined number of rows high and a predetermined number of bits wide, and where the method is used with a flag bit pointer, a column counter, and a row counter, the method comprising:

reading a flag word;

setting the flag bit pointer equal to the column's width minus one, where the flag bit pointer identifies flag bits in the flag words;

setting the column counter equal to the number of columns that make up the character;

creating a seed word with an initial value;

setting the row counter equal to the column's height;

determining if the flag bit identified by the flag bit pointer signals that a data word should be read;

if so, reading the next data word in the sequence and setting the seed word equal to the next data word;

if not, storing the seed word;

decrementing the flag bit pointer;

determining if the flag bit pointer is less than or equal to zero;

if so, reading the next flag word in the sequence and setting the flag bit pointer equal to the column's width minus one;

if not, decrementing the row counter;

determining if the row counter is less than or equal to zero;

if so, decrementing the column counter;

if not, repeating the steps listed above beginning with the step of determining if the flag bit identified by the flag bit pointer signals that a data word should be read;

determining if the column counter is less than or equal to zero; and if not, repeating the steps listed above beginning with the step of determining if the flag bit identified by the flag bit pointer signals that a data word should be read; but if so, ending the method.

* * * * *